US010389593B2

(12) United States Patent
Crudele et al.

(10) Patent No.: US 10,389,593 B2
(45) Date of Patent: Aug. 20, 2019

(54) REFINING OF APPLICABILITY RULES OF MANAGEMENT ACTIVITIES ACCORDING TO MISSING FULFILMENTS THEREOF

(71) Applicant: International Business Machines Corporation, Armonk, NY (US)

(72) Inventors: Michele Crudele, Rome (IT); Rosario Gangemi, Rome (IT); Antonio Perrone, Rome (IT)

(73) Assignee: International Business Machines Corporation, Armonk, NY (US)

( * ) Notice: Subject to any disclaimer, the term of this patent is extended or adjusted under 35 U.S.C. 154(b) by 222 days.

(21) Appl. No.: 15/425,497

(22) Filed: Feb. 6, 2017

(65) Prior Publication Data

US 2018/0227183 A1    Aug. 9, 2018

(51) Int. Cl.
*H04L 12/00* (2006.01)
*H04L 12/24* (2006.01)

(52) U.S. Cl.
CPC ...... *H04L 41/0893* (2013.01); *H04L 41/0672* (2013.01); *H04L 41/0816* (2013.01); *H04L 41/0823* (2013.01)

(58) Field of Classification Search
CPC . H04L 41/5009; H04L 63/20; H04L 63/1433; H04L 41/0893; H04L 41/0672; H04L 41/0823; H04L 41/0816
USPC ......................................... 709/223, 225, 224
See application file for complete search history.

(56) References Cited

U.S. PATENT DOCUMENTS

| 6,012,152 | A | * | 1/2000 | Douik ................. G06F 11/0709 |
| | | | | 714/26 |
| 7,302,397 | B1 | | 11/2007 | Hein et al. |
| 8,042,149 | B2 | * | 10/2011 | Judge ..................... G06F 21/554 |
| | | | | 713/188 |
| 8,214,877 | B1 | | 7/2012 | Grimes et al. |
| 8,539,545 | B2 | | 9/2013 | Kartha et al. |
| 8,627,403 | B1 | | 1/2014 | Kirshenbaum et al. |
| 8,661,505 | B2 | | 2/2014 | Kougiouris et al. |

(Continued)

OTHER PUBLICATIONS

List of IBM Patents or Patent Applications Treated as Related, Feb. 6, 2017, 2 pages.

*Primary Examiner* — Frantz Coby
(74) *Attorney, Agent, or Firm* — Francis Lammes; Stephen J. Walder, Jr.; Jeffrey S. LaBaw

(57) ABSTRACT

A mechanism is provided for managing a plurality of computing machines. An indication of a management activity having an applicability rule is deployed to a plurality of computing machines to cause each of the plurality of computing machines having corresponding values of one or more characteristics fulfilling the applicability rule to apply the management activity. Results are received indicating that the management activity has been applied successfully on corresponding success computing machines and that the management activity has not been applied on corresponding excluded computing machines. One or more candidate computing machines of the excluded computing machines is selected according to a comparison of the corresponding values of the further characteristics of the excluded computing machines with a success fingerprint. An indication of rule transformations and corresponding frequencies for use in transforming the applicability rule accordingly to a number of the candidate computing machines is then provided.

20 Claims, 7 Drawing Sheets

(56) References Cited

U.S. PATENT DOCUMENTS

| | | | |
|---|---|---|---|
| 8,949,208 B1* | 2/2015 | Xu | G06F 3/0641 |
| | | | 707/661 |
| 9,065,804 B2 | 6/2015 | Sweet et al. | |
| 9,088,570 B2 | 7/2015 | Anderson et al. | |
| 9,235,475 B1* | 1/2016 | Shilane | G06F 11/1453 |
| 9,319,430 B2* | 4/2016 | Bell, Jr. | H04L 63/1433 |
| 9,542,539 B2* | 1/2017 | Bell, Jr. | H04L 63/20 |
| 9,934,237 B1* | 4/2018 | Shilane | G06F 11/1453 |
| 2004/0139312 A1* | 7/2004 | Medvinsky | G06F 21/10 |
| | | | 713/150 |
| 2006/0064481 A1* | 3/2006 | Baron | H04L 41/0886 |
| | | | 709/224 |
| 2007/0107043 A1 | 5/2007 | Newstadt et al. | |
| 2007/0150330 A1* | 6/2007 | McGoveran | G06Q 10/06 |
| | | | 705/7.13 |
| 2007/0266421 A1* | 11/2007 | Vaidya | H04L 63/20 |
| | | | 726/1 |
| 2008/0086473 A1* | 4/2008 | Searl | G06F 21/552 |
| 2010/0005451 A1 | 1/2010 | Hirose et al. | |
| 2010/0094677 A1 | 4/2010 | Peltz et al. | |
| 2011/0231936 A1 | 9/2011 | Williams et al. | |
| 2013/0227105 A1* | 8/2013 | Crudele | H04L 41/5009 |
| | | | 709/223 |
| 2014/0247155 A1* | 9/2014 | Proud | H04W 4/70 |
| | | | 340/870.16 |
| 2015/0143524 A1 | 5/2015 | Chestna | |
| 2016/0232116 A1* | 8/2016 | Bone | H04W 4/70 |

\* cited by examiner

REFINING OF APPLICABILITY RULES OF MANAGEMENT ACTIVITIES ACCORDING TO MISSING FULFILMENTS THEREOF

BACKGROUND

The background of the present disclosure is hereinafter introduced with the discussion of techniques relating to its context. However, even when this discussion refers to documents, acts, artifacts and the like, it does not suggest or represent that the discussed techniques are part of the prior art or are common general knowledge in the field relevant to the present disclosure.

The present disclosure relates to the information technology field. More specifically, this disclosure relates to the management of computing machines.

The management of computing machines, generally referred to as endpoints (or targets), plays a key role in several contexts, especially in large organizations wherein their number may become very high (for example, up to some hundreds of thousands). In general, the management of the endpoints requires the execution of specific management activities thereon (for example, the application of a patch to a software program); these operations may be controlled with a centralized approach, wherein a management server directly enforces the application of the management activities on the endpoints, or with a localized (or distributed) approach, wherein each endpoint directly controls the application of the management activities thereon. Particularly, the management of the endpoints may be controlled according to a paradigm based on management policies. Each management policy indicates one or more management activities that have to be executed on the endpoints to make them compliant with the management policy; the management policies are deployed to the endpoints, which directly verify their compliance with the management policies and execute the corresponding management activities to remedy any non-compliance therewith. Various resource management tools are available for facilitating the management of the endpoints; a commercial example of these resource management tools, in particular conforming to the policy-based paradigm, is IBM BigFix by IBM Corporation (trademarks).

The execution of the management activities may be conditioned by corresponding applicability rules; for example, each applicability rule defines one or more applicability conditions (such as a specific operating system, a minimum free memory) that should be fulfilled to enable the application of the corresponding management activity. As a result, the management activities are applied only on the endpoints having corresponding characteristics that fulfill their applicability rules; this allows applying the management activities selectively, only on the endpoints where it is necessary.

However, the definition of the applicability rules may be quite difficult and time consuming. Indeed, the variability of the characteristics of the endpoints (especially in highly heterogeneous and dynamic environments) may hinder the correct definition of the applicability rules. Therefore, this task is generally based on a trial and error approach, wherein the applicability rules are updated repeatedly (for example, during a test phase) in an attempt to reach a result that is satisfactory with a certain degree of confidence. However, this substantially remains a manual task, which strongly depends on personal skills and experience (and then it is prone to human errors). Particularly, when the applicability rules are too broad they cause failures on the endpoints wherein the corresponding management activities are not to be applied. In this case, a troubleshooting of the failures is required to correct the applicability rules accordingly; however, this may be quite complex and time-consuming. Conversely, when the applicability rules are too restrictive they cause the missing application of the corresponding management activities on endpoints wherein they are instead required. In this case, it may be even more difficult to identify the endpoints wherein the management activities are to be applied (and then correct the applicability rules accordingly). Indeed, this does cause any failure during the application of the management activities (so that it is not possible to detect the corresponding errors in the applicability rules immediately); any problems that may be caused by the missing application of the management activities manifest later on (even after a relatively long time) so that the identification of their correlation with the errors in the applicability rules requires deep investigations.

All of the above may have a detrimental effect on the whole management of the endpoints.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided for managing a plurality of computing machines. The illustrative embodiment deploys an indication of a management activity having an applicability rule to the plurality of computing machines to cause each of the computing machines having corresponding values of one or more characteristics fulfilling the applicability rule to apply the management activity on the computing machine. The illustrative embodiment receives corresponding results of the deploying of the management activity to each computing machine of the plurality of computing machines, the results indicating that the management activity has been applied successfully on corresponding success computing machines of the plurality of computing machines and that the management activity has not been applied on corresponding excluded computing machines of the plurality of computing machines. The illustrative embodiment determines a success fingerprint according to corresponding values of one or more further characteristics of at least part of the success computing machines. The illustrative embodiment selects one or more candidate computing machines of the excluded computing machines according to a comparison of the corresponding values of the further characteristics of the excluded computing machines with the success fingerprint. The illustrative embodiment determines one or more rule transformations and frequencies of the rule transformations for the candidate computing machines according to a comparison of the corresponding values of the characteristics of the candidate computing machines with the applicability rule, each of the one or more rule transformations being adapted to make the applicability rule fulfilled by a number of the one or more candidate computing machines defining the corresponding frequency. The illustrative embodiment provides an indication of the rule transformations and of the corresponding frequencies for use in transforming the applicability rule accordingly.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The solution of the present disclosure, as well as further features and the advantages thereof, will be best understood with reference to the following detailed description thereof, given purely by way of a non-restrictive indication, to be read in conjunction with the accompanying drawings (wherein, for the sake of simplicity, corresponding elements are denoted with equal or similar references and their explanation is not repeated, and the name of each entity is generally used to denote both its type and its attributes—such as value, content and representation). Particularly.

DETAILED DESCRIPTION

With reference in particular to FIG. 1A-FIG. 1D, the general principles are shown of the solution according to an embodiment of the present disclosure.

Figure 1A:
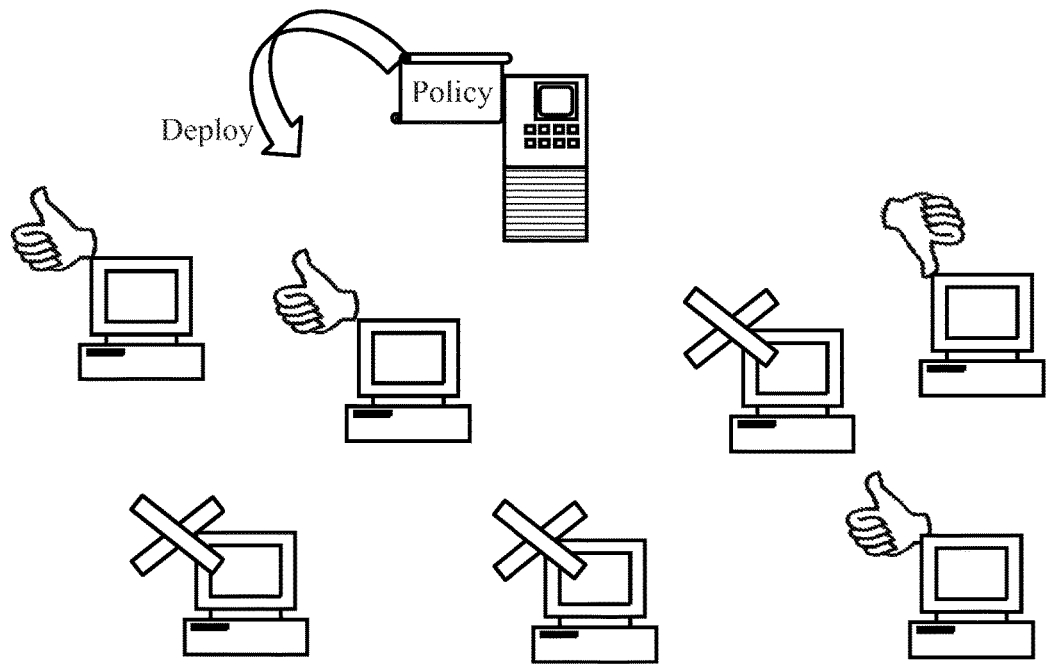
FIG. 1A-FIG. 1D show the general principles of the solution according to an embodiment of the present disclosure.

Starting from FIG. 1A, an indication of a management activity, for example, a management policy, is deployed to a plurality of computing machines, or endpoints (for example, by a management server); the management policy has an applicability rule that determines the endpoints wherein the policy has to be applied. In response thereto, each endpoint enforces the management policy thereon. Particularly, the management policy is not applied on the endpoints wherein corresponding values of one or more characteristics (for example, operating system, memory size) do not fulfill the applicability rule (denoted with a cross symbol), hereinafter referred to as excluded endpoints. The management policy is applied (by executing its management activity) only on the endpoints having the corresponding values of the same characteristics that fulfill the applicability rule; the application of the management policy may succeed on some of the endpoints (denoted with a thumb-up symbol), hereinafter referred to as success endpoints, and it may fail on some of the endpoints (denoted with a thumb-down symbol), hereinafter referred to as failure endpoints.

Figure 1B:
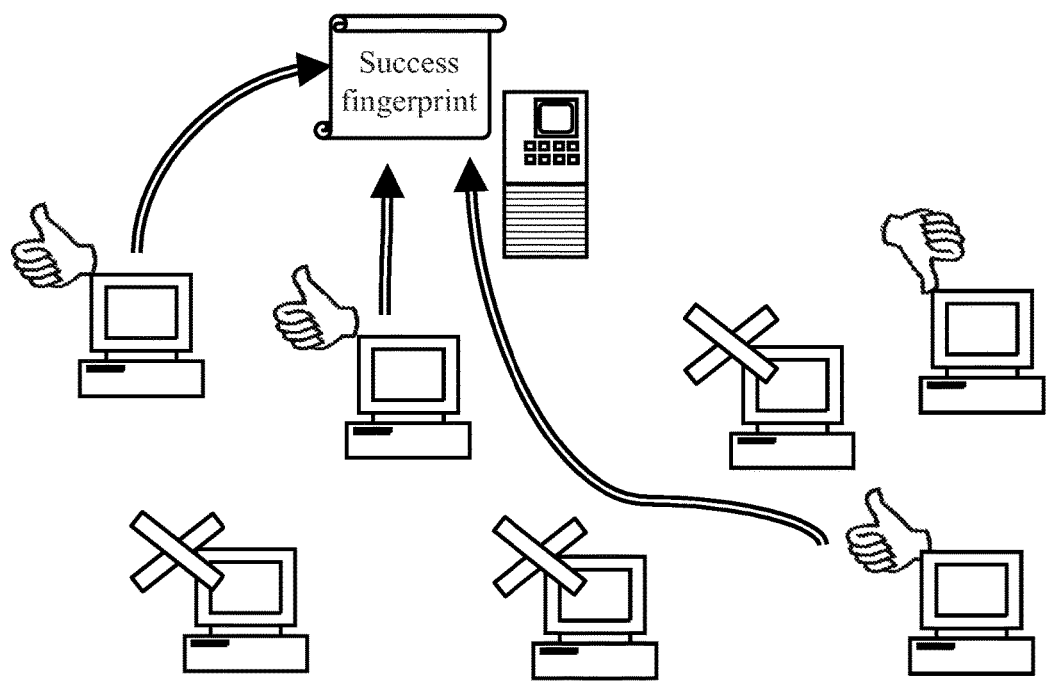

Moving to FIG. 1B, corresponding results of the deployment of the policy to the endpoints are received (by the management server); particularly, each result indicates whether the management policy has been applied (for the success/failure endpoints) or not (for the excluded endpoints), and in the first case whether the application of the management policy has been successful (for the success endpoints) or failed (for the failure endpoints).

In the solution according to an embodiment of the present disclosure, a success fingerprint is determined according to the corresponding values of further characteristics of the success endpoints (or at least part of them). For example, these characteristics are all the ones that may be collected on the endpoints, with the ones used to define the applicability rule that are a subset thereof; the success fingerprint may then be determined by aggregating the values of the characteristics that are common to all the success endpoints. Therefore, the success fingerprint is representative of the characteristics of the endpoints that make the policy applicable successfully on them.

Figure 1C:
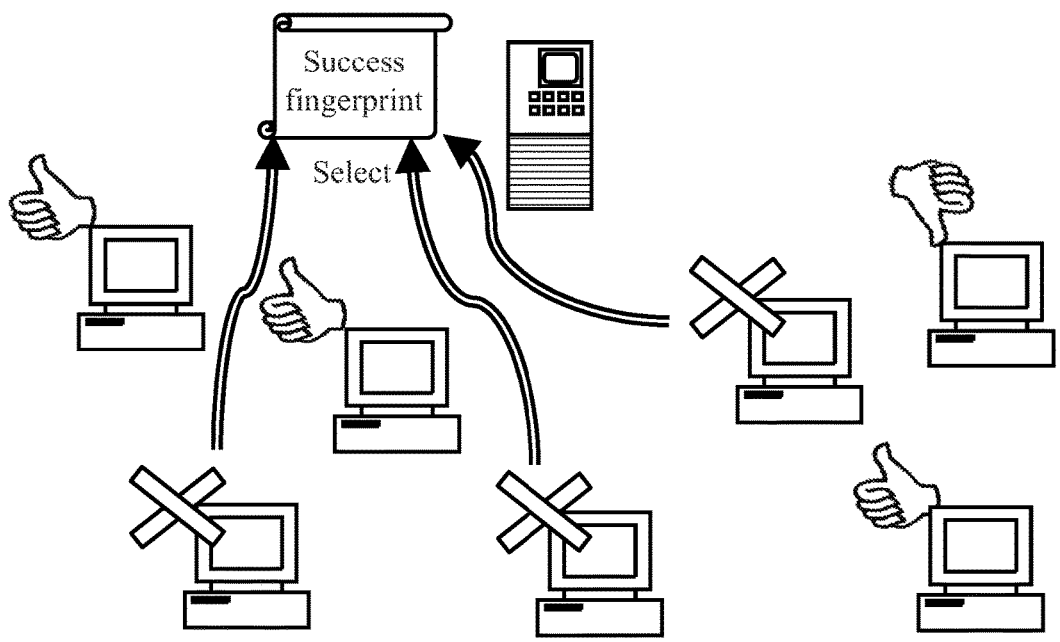

Moving to FIG. 1C, one or more of the excluded endpoints, hereinafter referred to as candidate endpoints, are selected among the excluded endpoints. The candidate endpoints are selected according to a comparison of the corresponding values of all the characteristics of the excluded endpoints with the success fingerprint; for example, the candidate endpoints have corresponding similarity indexes (measuring their similarity with the success fingerprint and then with the success endpoints) that reach a similarity threshold. Therefore, the candidate endpoints are the excluded endpoints most similar to the success endpoints, and then the ones wherein it is more likely that the management policy should have to be applied as well.

Figure 1D:
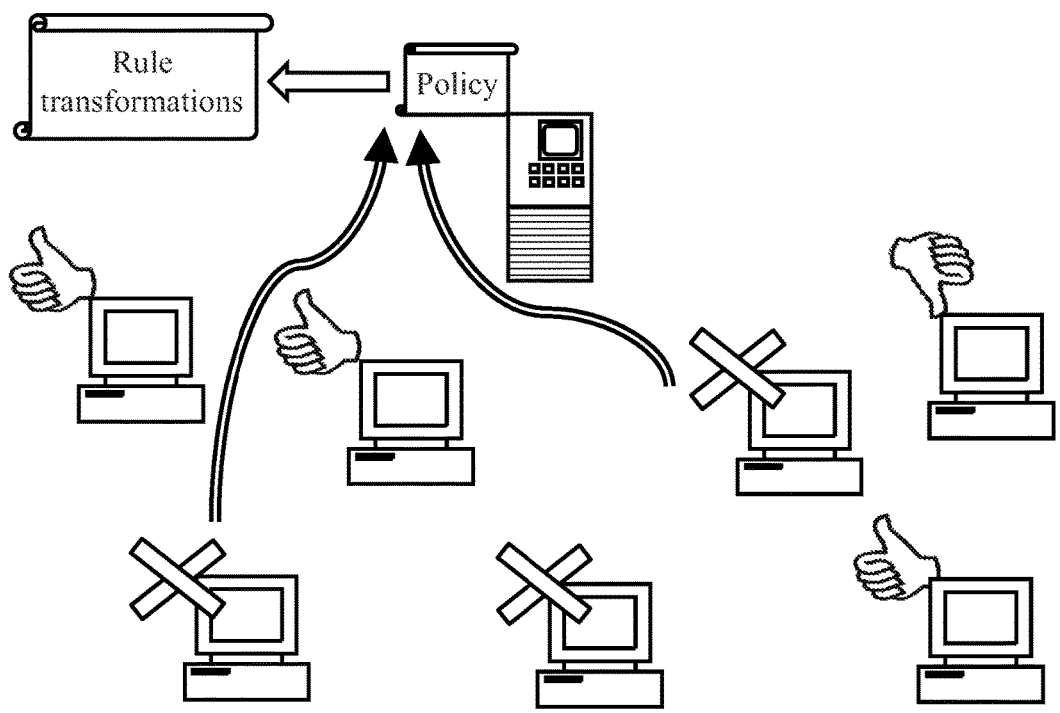

Moving to FIG. 1D, one or more rule transformations and corresponding frequencies are determined for the candidate endpoints; the rule transformations are determined according to a comparison of the corresponding values of the characteristics of the candidate endpoints with the applicability rule. Particularly, each rule transformation is adapted to make the applicability rule fulfilled by one or more candidate endpoints (for example, removing or relaxing corresponding applicability conditions, such as not requiring a Bluetooth connection any longer or reducing the minimum size of the memory that is required); the number of candidate endpoints (wherein the rule transformation make the applicability rule fulfilled and then the management policy applicable) defines the corresponding frequency (for example, by its absolute value). An indication of the rule transformations and of the corresponding frequencies is then provided (for example, by displaying it on the management server). This information may be used for transforming the applicability rule accordingly, for example, by assisting a system administrator to refine it during a test phase, starting from a rough (inaccurate and/or incomplete) version thereof.

The above-described solution facilitates the definition of the applicability rule, significantly reducing the time required for this task (and especially the number of trials to be repeated). Particularly, the rule transformations significantly reduce the manual intervention for refining the applicability rule (down to remove it at all), thereby making the task less dependent on personal skills and experience (and then less prone to human errors).

The desired result is achieved by leveraging the endpoints wherein the management policy has been applied successfully; particularly, these endpoints are used as a reference that is expanded to obtain a more complete set of endpoints wherein the management policy has to be applied. In this way, the applicability rule converges towards its correct definition in a simple and fast way.

All of the above has a beneficial effect on the whole management of the endpoints; indeed, in this way it is possible to reach a stable condition (with correct applicability rules) in a short time.

Figure 2:
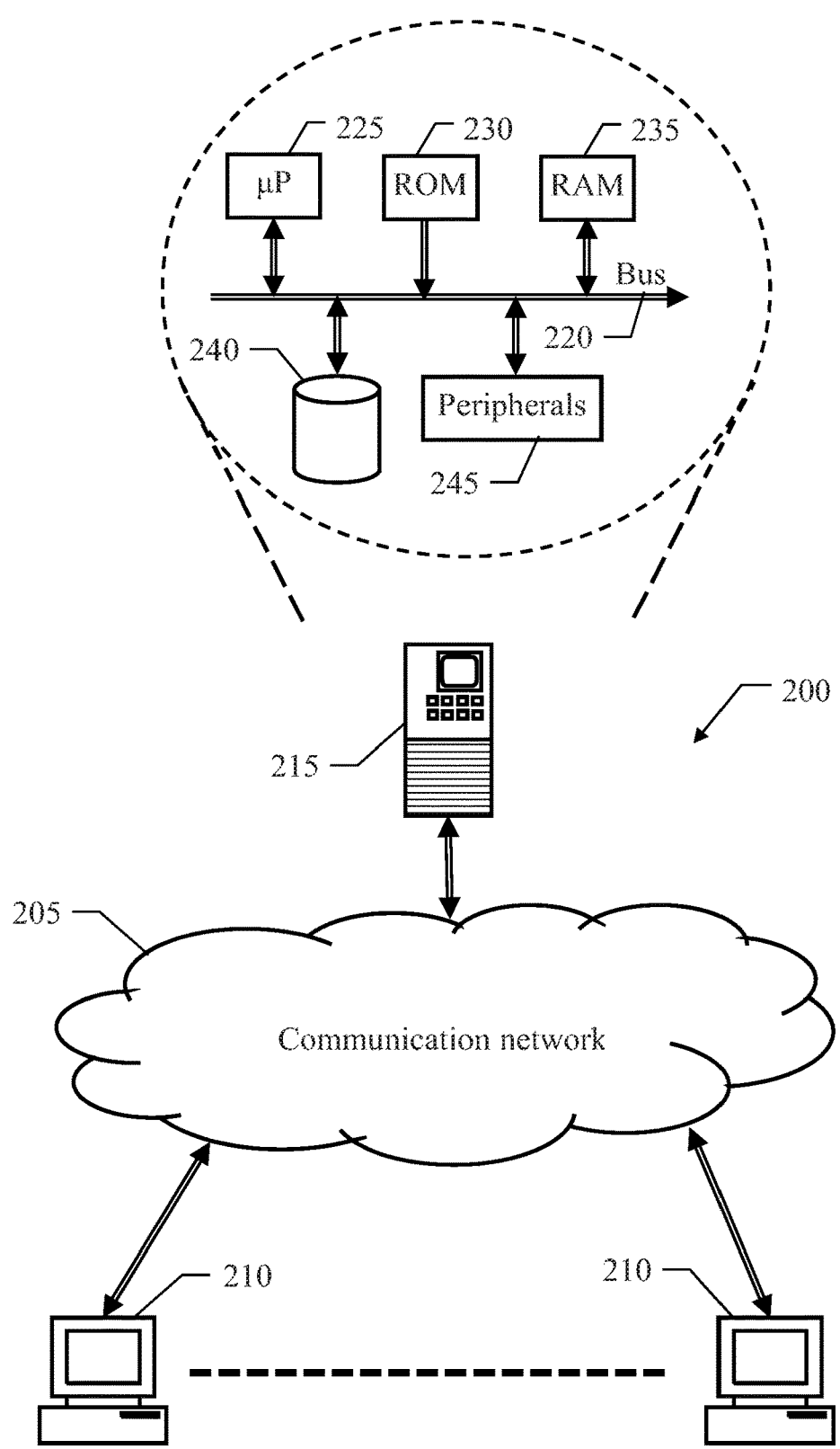
FIG. 2 shows a schematic block diagram of a computing system wherein the solution according to an embodiment of the present disclosure may be practiced.

With reference now to FIG. 2, a schematic block diagram is shown of a computing system 200 wherein the solution according to an embodiment of the present disclosure may be practiced.

The computing system 200 has a distributed architecture based on a communication network 205 (for example, the Internet). Several computing machines are connected to the communication network 205. A plurality of the computing machines, denoted with the reference 210, define the endpoints; another one of the computing machines (or more), denoted with the reference 215, defines the management server (which controls the management of the endpoints 210).

Each of the computing machines 210,215 comprises several units that are connected among them with a bus architecture 220 (with one or more levels). Particularly, one or more microprocessors (μP) 225 control operation of the computing machine 210,215; a non-volatile memory (ROM) 230 stores basic code for a bootstrap of the computing machine 210,215 and a volatile memory (RAM) 235 is used as a working memory by the microprocessors 220. The computing machine 210,215 is provided with a mass-memory 240 for storing programs and data; for example, the mass-memory 240 of the endpoints 210 may comprise solid-state disks, whereas the mass-memory 240 of the management server 215 may comprise storage devices of a data center wherein the management server is implemented. Moreover, the computing machine 210,215 comprises a number of peripheral (or Input/Output, I/O) units 245; for example, the peripheral units 245 of the endpoints 210 may comprise a monitor, a keyboard, a mouse, a drive for reading/writing removable storage units (like DVDs) and a wireless network adapter for accessing the communication network 205, whereas the peripheral units 245 of the management server 215 may comprise a network adapter for plugging it in the data center and a similar drive for reading/writing removable storage units implemented by a console of the data center.

Figure 3:
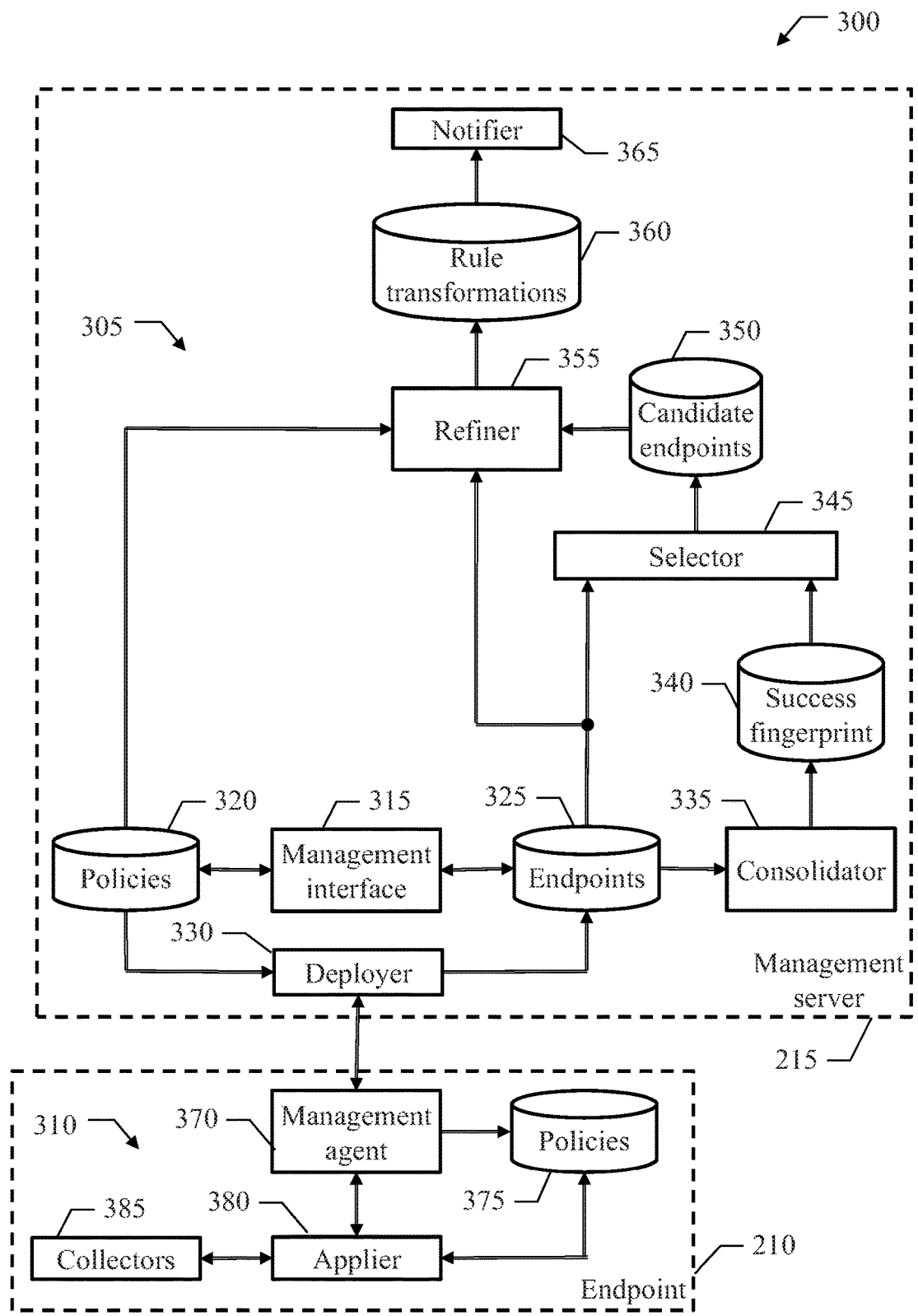
FIG. 3 shows the main software components that may be used to implement the solution according to an embodiment of the present disclosure.

With reference now to FIG. 3, the main software components are shown that may be used to implement the solution according to an embodiment of the present disclosure.

All the software components (programs and data) are denoted as a whole with the reference 300. The software components are typically stored in the mass memory and loaded (at least partially) into the working memory of the corresponding computing machines when the programs are running, together with an operating system and other application programs (not shown in the figure). The programs are initially installed in the mass memory, for example, from removable storage units or from the communication network. In this respect, each program may be a module, segment or portion of code, which comprises one or more executable instructions for implementing the specified logical function.

Particularly, a resource management tool conforming to the policy-based paradigm (for example, the above-mentioned BigFix) comprises a server-side management component 305 running on the management server 215 and an endpoint-side management component 310 running on each endpoint 210 (only one shown in the figure).

Starting from the server-side management component 305 (on the management server 215), it comprises the following elements. A management interface 315 (for example, of the GUI type) is used to control the management of the endpoints 210. The management interface 315 accesses (in read/write mode) a global policy repository 320, which stores the definition of the management policies that are available to manage the endpoints 210. The management policies are defined at high level, independently of an actual implementation of the endpoints 210. Particularly, each management policy indicates a corresponding management activity that has to be executed on the endpoints 210 to make them compliant with the management policy; for example, the management activity is defined by a controlled sequence of management commands (called actions in the BigFix) for installing a software product, for upgrading it to a different version, for applying a service pack or a patch thereto. Moreover, the management policy may indicate the corresponding applicability rule (called relevance and written in a so-called relevance language in the BigFix), which defines the endpoints 210 (fulfilling it) on which the management policy should be applied. For example, the applicability rule is defined by an expression that combines one or more applicability conditions each one based on the value of a hardware, software and/or logic characteristic of the endpoints 210 (for example, with logical operators and/or programming constructs). The characteristics may be static when their values may be collected independently of the deployment of the management policies (since they are not strictly dependent on the specific time of verification of the applicability rule); these characteristics define a current configuration of the endpoints 210 that changes relatively slowly (typically tracked by inventory processes), for example, mass memory size, operating system, network domain. Moreover, the characteristics may be dynamic when their values are to be collected in correspondence to the deployment of the management policies (since they are strictly dependent on the specific time of verification of the applicability rule); these characteristics define a contingent situation of the endpoints 210 that changes relatively rapidly (typically not tracked by inventory processes), for example, working memory usage, running services, logged user.

The management interface 315 also accesses (in read mode) an endpoint repository 325, which stores state information of the endpoints 210; particularly, for each endpoint 210 (indicated by a corresponding unique identifier, for example, its hostname), the state information indicates the current values of the characteristics of the endpoint 210, the management policies that have been applied on the endpoint 210 and its compliance therewith (i.e., whether the application of each management policy has succeeded or failed). The management interface 315 may be used by the system administrator to maintain (i.e., create, update, delete) the definition of the management policies, to deploy them (for example, according to a management plane) and to inspect the state information of the endpoints 210. A policy deployer 330 is used to deploy the management policies to the endpoints 210 (for example, via an ad-hoc deployment infrastructure, not shown in the figure). The policy deployer 330 accesses (in read mode) the policy repository 320 and it accesses (in read/write mode) the endpoint repository 325.

In the solution according to an embodiment of the present disclosure, a consolidator 335 is used to determine the success fingerprints (of the success endpoints of each management policy). The consolidator 335 accesses (in read mode) the endpoint repository 325. The consolidator 355 accesses (in write mode) a success fingerprint table 340, which stores the success fingerprint of each management policy. A selector 345 is used to select the candidate endpoints (among the excluded endpoints of each management policy). The selector 345 accesses (in read mode) the endpoint repository 325 and the success fingerprint table 340. The selector 345 accesses (in write mode) a candidate endpoint table 350, which stores an indication of the candidate endpoints for each management policy (for example, a list of their identifiers). A refiner 355 is used to determine the rule transformations and their frequencies (for each management policy). The refiner 335 accesses (in read mode) the candidate endpoint table 350, the endpoint repository 325 and the policy repository 320. The refiner 355 accesses (in write mode) a rule transformation file 360, which stores the rule transformations with their frequencies for each management policy. A notifier 365 is used to notify the rule transformations (for example, by driving a monitor drive). The notifier 365 accesses (in read mode) the rule transformation file 360.

Moving to the endpoint-side management component 310 (on the endpoint 210), it comprises the following elements. A management agent 370 is used to control the application of the management policies on the endpoint 215. The management agent 370 interacts with the policy deployer 330 (via management messages, called fixlets in the BigFix) and it accesses (in write mode) a local policy repository 375. The local policy repository 375 stores the definition of the management policies that have been deployed to the endpoint 210 and its compliance therewith. The management agent 370 interacts with a policy applier 380, which is used to verify the applicability rules of the management policies and to apply them on the endpoint 210. The policy applier 380 accesses (in read/write mode) the local policy repository 375. Moreover, the policy applier 380 exploits one or more collectors 385 (called inspectors in the BigFix), which are used to collect the values of the characteristics of the endpoint 210, for example, by invoking corresponding Application Program Interfaces (APIs) of its operating system.

Figure 4A:
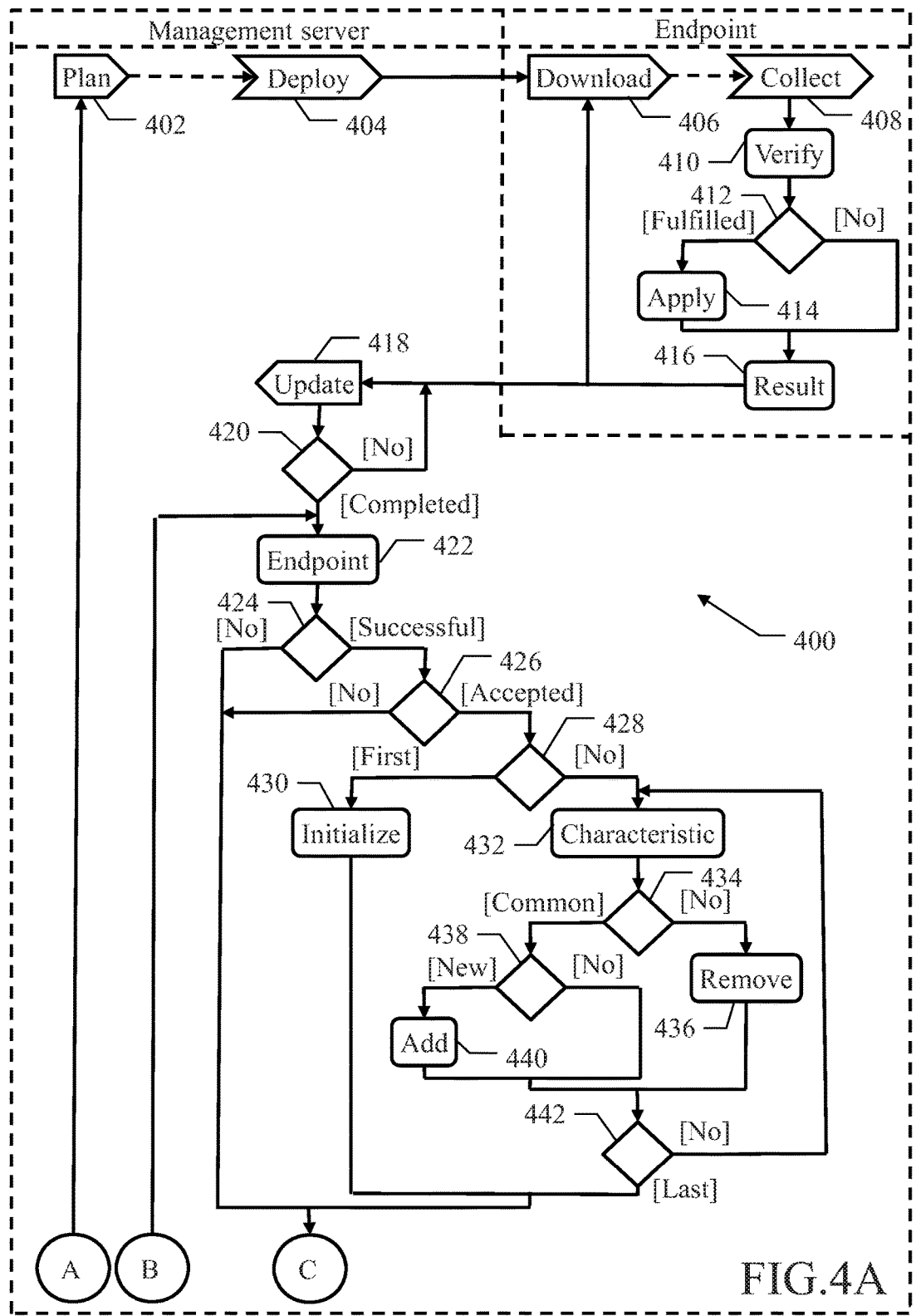
FIG. 4A-FIG. 4C show an activity diagram describing the flow of activities relating to an implementation of the solution according to an embodiment of the present disclosure.
Figure 4B:
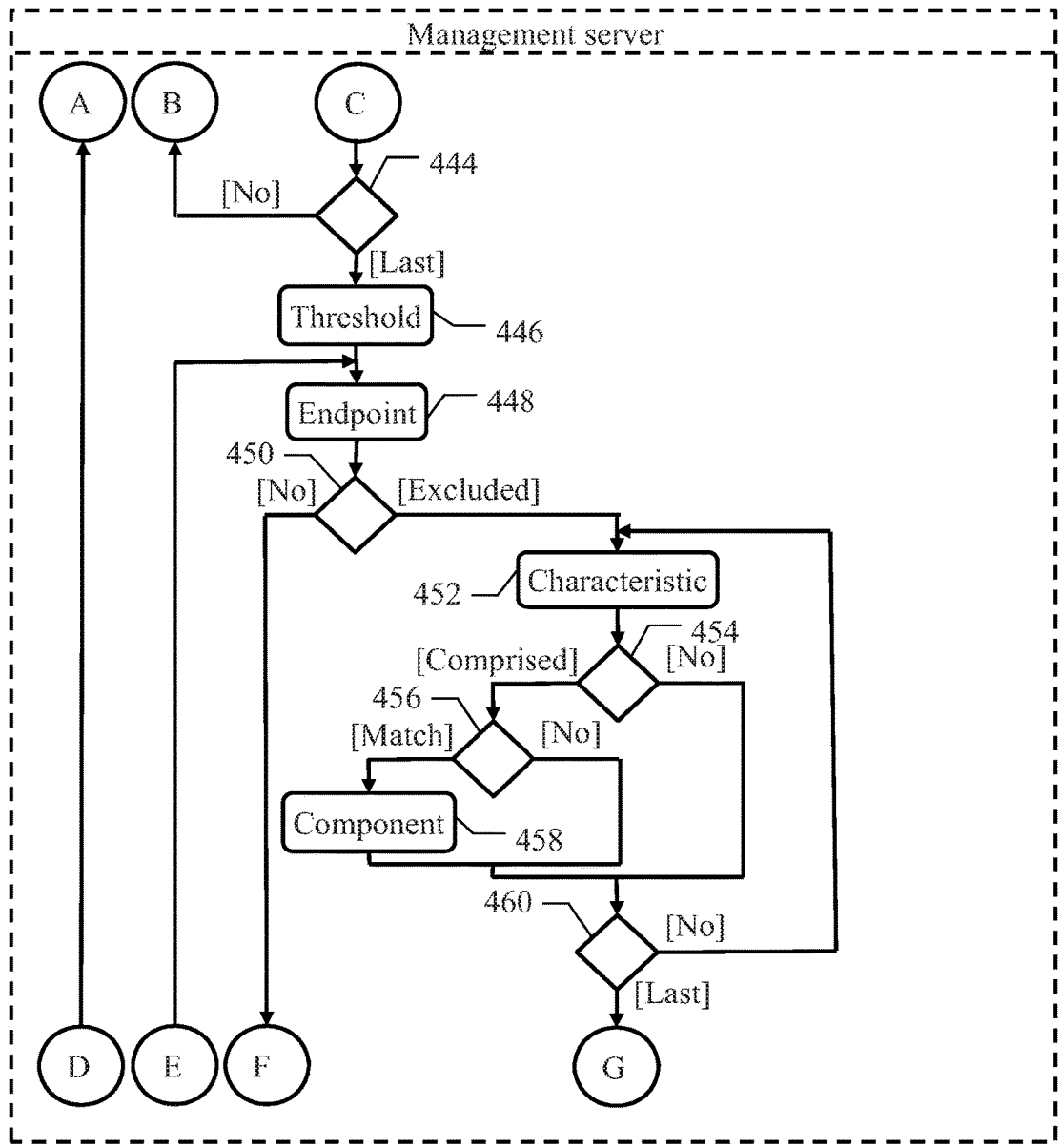
Figure 4C:
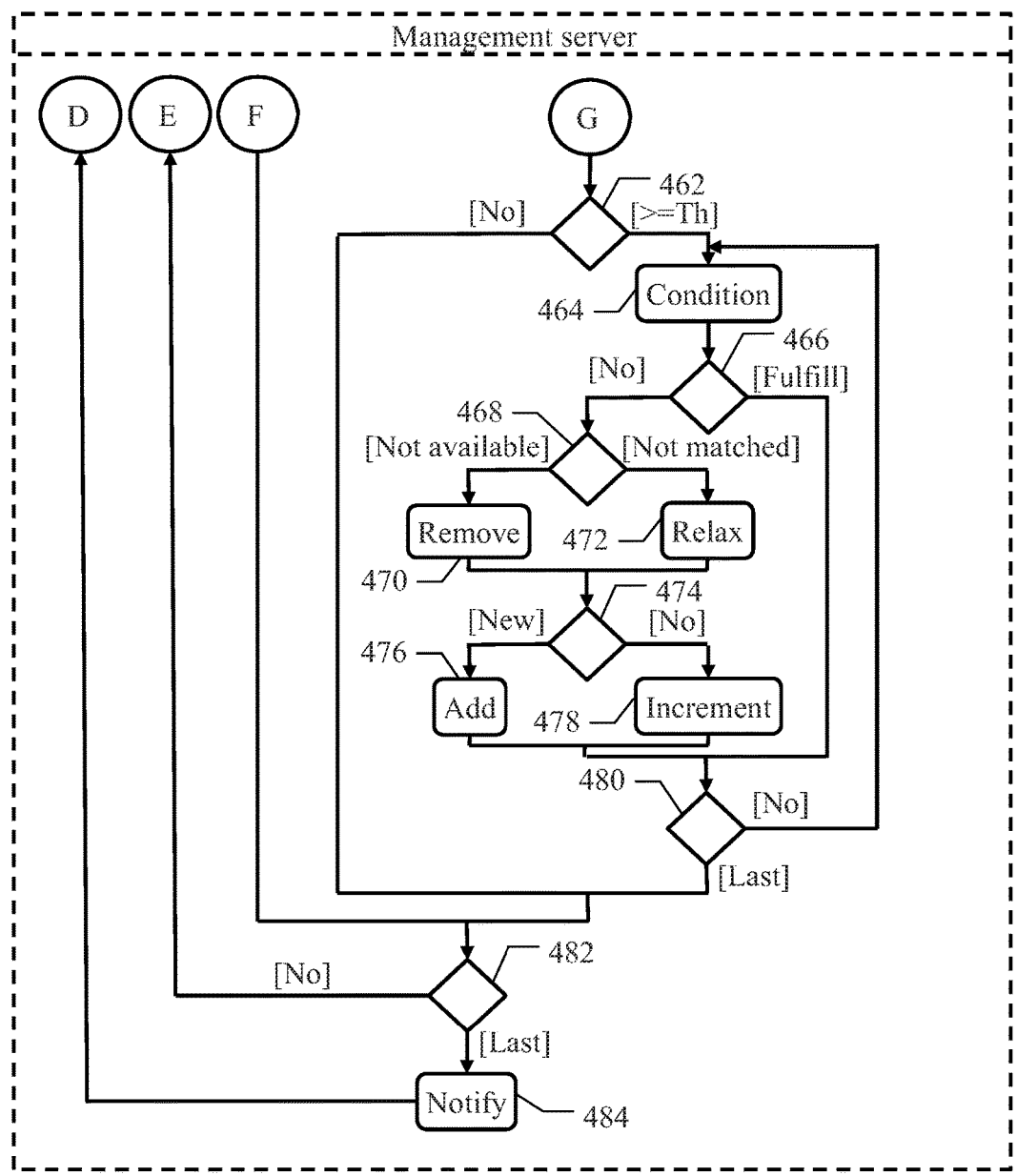

With reference now to FIG. 4A-FIG. 4C, an activity diagram is shown describing the flow of activities relating to an implementation of the solution according to an embodiment of the present disclosure.

Particularly, the diagram represents an exemplary process that may be used to manage the endpoints with a method 400. In this respect, each block may correspond to one or more executable instructions for implementing the specified logical function on the computer.

The process passes from block 402 to block 404 in the swim-lane of the management server as soon as any management policy has to be deployed (for example, when this operation is scheduled in a management plan); in response thereto, the deployer extracts the management policy from the corresponding repository and makes it available for downloading to the endpoints (for example, in the deployment infrastructure).

Moving to block 406 in the swim-lane of each endpoint (only one shown in the figure), the management agent downloads the management policy as soon as it is available (for example, detected by monitoring the deployment infrastructure periodically) and it saves the management policy into the local policy repository. In response thereto, the policy applier at block 408 collects the values of the characteristics indicated in the applicability rule of the management policy that are available on the endpoint (by calling the corresponding collectors). Continuing to block 410, the policy applier verifies the applicability rule of the management policy, by evaluating it according to these values of its characteristics. The flow of activity then branches at block 412 according to the result of the evaluation of the applicability rule. Particularly, at block 412 if the applicability rule is fulfilled (i.e., its expression evaluates to true), the policy applier at block 414 applies the management policy on the endpoint (assuming that the endpoint is not already compliant with the management policy, as indicated in the local policy repository); for this purpose, the policy applier controls the submission of its management commands (suitably translated into actual commands that may be executed on the endpoint) according to the sequence defined in the management policy (for example, involving downloading a software package from a software distribution depot and launching it, deleting files, updating configuration parameters). The process then descends into block 416; the same point is also reached directly from the block 412 if the applicability rule is not fulfilled (and then the management policy is not to be applied on the endpoint). At this point, the policy applier saves a result of the deployment of the policy into the local policy repository (with its management commands that are rolled-back in case of failure of the management policy so as to restore the state of the endpoint preceding its application). The policy applier then returns (through the management agent) this result to the policy deployer of the management server, particularly, the result indicates whether the management policy has been applied or not on the endpoint, and in the first case whether the application of the management policy has succeeded or failed (for example, together with a corresponding error message). Moreover, the result also comprises the values of any (dynamic) characteristics that have been collected on the endpoint in this phase (for example, as indicated in the management policy). The flow of activity then returns to the block 406 waiting for the deployment of a next management policy.

Referring back to the swim-lane of the management server, the policy deployer is listening at block 418 for the results of the deployment of the management policy from the endpoints; as soon as a (new) result is received, the management deployer updates the endpoint repository accordingly. A test is then made at block 420, wherein the policy deployer verifies whether the deployment of the policy has been completed (for example, after receiving all the corresponding results or in any case after a pre-defined time limit). If at block 420 the deployment of the policy has not been completed, the process returns to the block 418 waiting for a further result from the endpoints.

Conversely, if at block 420 the deployment of the policy has been completed, a loop in entered for determining the success fingerprint of the management policy. The loop begins at block 422, wherein the consolidator takes a (current) endpoint into account (as indicated in the endpoint repository, in any arbitrary order). The consolidator then verifies at block 424 whether the management policy has been applied successfully on the endpoint (as indicated in the endpoint repository). If at block 424 the management policy has been applied successfully on the endpoint so (meaning that a success endpoint is under processing), the consolidator at block 426 applies a reduction algorithm, which accepts the success endpoint randomly according to a reduction percentage. In this way, the success endpoints that are processed (for determining the success fingerprint) are only a subset thereof; in any case, this subset is defined so as to be statistically significant (for example, by setting the reduction percentage to 20-80%, preferably 30-70% and still more preferably 40-60%, such as 50%). This involves a considerable saving of computation time without substantially affecting the accuracy of the success fingerprint (for representing the characteristics of the success endpoints). If at block 426 the success endpoint has been accepted, the consolidator at block 428 verifies whether the success fingerprint has already been initialized.

If at block 428 success fingerprint has not already been initialized (meaning that this is the first success endpoint that is processed and accepted), the consolidator adds the values of all the characteristics of the success endpoint to the success fingerprint (for example, in the form of corresponding key/value pairs). Conversely (if this is not the first success endpoint that is processed and accepted), an inner loop is entered for processing the characteristics of the success fingerprint. The loop begins at block 432 wherein the consolidator takes a (current) characteristic of the success fingerprint into account (starting from a first one in any arbitrary order). The consolidator at block 434 verifies whether this characteristic is available in the success endpoint. If at block 434 the characteristic is not available in the success endpoint (meaning that the characteristic is not in common to all the successful endpoints that have been accepted up to now), the consolidator at block 436 removes the characteristic from the success fingerprint.

Conversely, if at block 434 the characteristic is available in the success endpoint, a test is made at block 438 wherein the consolidator verifies whether the value of this characteristic in the success endpoint is already comprised in the success fingerprint. If at block 438 the success endpoint is not already comprised in the success fingerprint, the consolidator at block 440 adds the (new) value of the characteristic in the success endpoint to the success fingerprint. The flow of activity merges again at block 442 from the block 436, from the block 440, or directly from the block 438 (if the value of the characteristic in the success endpoint is already comprised in the success fingerprint). At block 442 the consolidator verifies whether a last characteristic of the success fingerprint has been processed.

If at block 442 the last characteristic of the success fingerprint has not been processed, the flow of activity returns to the block 432 to repeat the same operations on a next characteristic of the success fingerprint. Conversely, at block 442, once all the characteristics of the success fingerprint have been processed, the flow of activity descends into block 444; the same point is also reached from the block 430 or directly from the 424 (if the management policy has not been applied or its application has failed on the endpoint) or the block 426 (if the success endpoint has not been accepted). At block 444, the consolidator verifies whether a last endpoint has been processed. If at block 444 the last endpoint has not been processed, the flow of activity returns to the block 422 to repeat the same operations on a next endpoint. Conversely, at block 444, once all the endpoints have been processed, the loop is exit by descending into block 446. In this way, the success fingerprint is defined by the characteristics that are in common to all the (accepted) success endpoints, each one associated with the union of the corresponding values in all the same success endpoints. For example, the values of the characteristics of the following (very simple) success endpoints:

$EPs_1$={(OperatingSystem=OS$a$),(Version=7), (Memory=10 G),(Bluetooth=4)}

$EPs_2$={(OperatingSystem=OS$a$),(Version=6), (Memory=50 G),(Bluetooth=3)}

$EPs_3$={(OperatingSystem=OS$a$),(Version=8), (Memory=5 G),(Bluetooth=3),(NFC=Yes)}

$EPs_4$={(OperatingSystem=OS$a$),(Version=8), (Memory=20 G),(Bluetooth=2)} provide the following success fingerprint (SFP):

SFP={(OperatingSystem=OS$a$),(Version={6,7,8}), (Memory={5 G, 10G, 20 G, 50 G}),(Bluetooth={2,3,4})} indicating (for all the success endpoints) the operating system, its versions, the sizes of the free memory space and the types of Bluetooth.

With reference now to the block 446, the selector calculates a maximum value of the similarity index with the success fingerprint (as defined by the success endpoints). The maximum value of the similarly index is obtained by summing similarity components corresponding to the characteristics of the success fingerprint; each similarity component (SI) is given by:

$$SC=e^{1-NV},$$

wherein NV is the cardinality of the corresponding characteristic, defined by the number of its values. Therefore, the maximum value of the similarity index (SImax) for the above-mentioned success fingerprint is:

$$SImax=e^{1-1}+e^{1-3}+e^{1-4}+e^{1-3}=e^0+e^{-2}+e^{-3}+e^{-2}=1.00+0.14+0.05+0.14=1.33.$$

A loop is then entered for determining the rule transformations. The loop begins at block 448, wherein the selector takes a (current) endpoint into account (as indicated in the endpoint repository, in any arbitrary order). The selector then verifies at block 450 whether the management policy has not been applied on the endpoint (as indicated in the endpoint repository). If at block 450 the management policy has been applied on the endpoint (meaning that an excluded endpoint is under processing), a loop is entered at block 452 for calculating the similarity index of the excluded endpoint (coherently with its definition used to calculate the maximum value as indicated above); the loop begins with the selector that takes a (current) characteristic of the excluded endpoint into account (starting from a first one in any arbitrary order). The selector then verifies at block 454 whether this characteristic is comprised in the success fingerprint. If at block 454 the characteristic is comprised in the success fingerprint, the selector at block 456 further verifies whether the value of this (matching) characteristic in the excluded endpoint matches its value(s) in the success fingerprint as well. If at block 456 the (matching) characteristic in the excluded endpoint matches its value(s) in the success fingerprint, the selector at block 458 calculates the corresponding similarity component as above ($SC=e^{1-NV}$) and then adds it to the similarity index (initialized to zero). In this way, the value of the similarity component is maximum when the characteristic has a single value in the success fingerprint (i.e., $SC=e^{1-1}=e^0=1.00$) and it decreases exponentially as the number of values in the success fingerprint increases (i.e., $SC=e^{1-2}=e^{-1}=0.35$ for NV=2, $SC=e^{1-3}=e^{-2}=0.14$ for NV=3, $SC=e^{1-4}=e^{-3}=0.05$ for NV=4 and so on); therefore, the similarity component contributes to the similarity index with a weight that is higher when the cardinality of the success fingerprint, i.e., the number of its values, is low (and then its matching by the value in the excluded endpoint is more significant since few, down to none, alternatives are acceptable) and that decreases very fast as the cardinality of the success fingerprint becomes higher (and then its matching by the value in the excluded endpoint is less and less significant since many alternatives are acceptable). Therefore, in the above-mentioned example of success fingerprint, the similarity index is defined mainly by the operating system (1.00), to a far lesser extent by its version and by the type of Bluetooth (0.14), whereas the contribution of the free memory space is negligible (0.05); for example, the similarity index ($SI_i$) of the following (very simple) excluded endpoints ($EP_i$) is:

$EP_1$={(OperatingSystem=OS$b$),(Version=7), (Memory=5),(Bluetooth=4)}

$SI_1$=0+0.14+0.05+0.14=0.33, $EP_2$={(OperatingSystem=OS$a$),(Version=8), (Memory=20 G)}

$SI_2$=1.00+0.14+0.05+0=1.19, $EP_3$={(OperatingSystem=OS$a$),(Version=9), (Memory=10 G),(Bluetooth=3)}

$SI_3$=1.00+0+0.05+0.14=1.19, $EP_4$={(OperatingSystem=OS$a$),(Version=7), (Memory=4 G),(Bluetooth=4)}

$SI_4$=1.00+0.14+0+0.14=1.28,

The flow of activity merges again at block 460 from the block 458 or directly from the block 454 (if the characteristic of the excluded endpoint is not comprised in the success fingerprint) or from the block 456 (if the value of the characteristic in the excluded endpoint is not comprised in the success fingerprint). At block 460, the selector verifies whether a last characteristic of the excluded endpoint has been processed. If at block 460 the last characteristic of the excluded endpoint has not been processed, the flow of activity returns to the block 452 to repeat the same operations on a next characteristic of the excluded endpoint.

Conversely, at block 460 once all the characteristics of the excluded endpoint have been processed, the loop is exit by descending into block 462; at this point, the selector compares the similarity index of the excluded endpoint with a similarity threshold depending on its maximum value (for example, equal to 80-99%, preferably 83-97%, more preferably 85-95% and still more preferably 87-95%, such as 90% thereof). If at block 462 the similarity index of the excluded endpoint is (possibly strictly) higher than the similarity threshold, the excluded endpoint is selected as a candidate endpoint; for example, in the above-mentioned case (assuming a similarity threshold ST=0.85*Simax=0.85*1.33=1.13) the excluded endpoints $EP_2$, $EP_3$, $EP_4$ are selected (since slightly differing from the success endpoints), whereas the excluded endpoint $EP_1$ is discarded (since differing substantially from the success endpoints because of its operating system).

In response thereto, a loop is entered at block 464 for determining any corresponding rule transformations; the loop begins with the refiner that takes a (current) applicability condition of the applicability rule into account (starting from a first one in any arbitrary order). The refiner at block 466 then verifies its contribution to the missing fulfillment of the applicability rule by the candidate endpoint. If at block 466 the candidate endpoint does not fulfil the applicability condition (because the corresponding characteristic is not available on the candidate endpoint or its value in the candidate endpoint does not match the applicability condition) and this causes (alone or in combination with other applicability conditions) the missing fulfillment of the applicability rule (for example, always for applicability conditions in logical AND or only for one of applicability conditions in logical OR, such as the first one), the process descends into block 468. At block 468, the flow of activity branches according to the cause of the missing fulfillment of the applicability condition. Particularly, if at block 468 the characteristic of the applicability condition is not available on the candidate endpoint, the refiner at block 470 determines the rule transformation to indicate a removal of the applicability condition from the applicability rule; for example, a candidate endpoint without any Bluetooth does not fulfill an applicability rule AR=(OperatingSystem=OSa) AND (Version IN {6,7,8}) AND (Memory>=5 G) AND (Bluetooth=4), so that the corresponding applicability condition AC=(Bluetooth=4) should be removed.

Conversely, if at block 468 the characteristic of the applicability condition is available on the candidate endpoint but its value does not match the applicability condition, the refiner at block 472 determines the rule transformation to indicate a corresponding relaxation of the applicability condition. Particularly, the applicability condition is relaxed to the minimum extent required to make it fulfilled by the value of the corresponding characteristic in the candidate endpoint. Therefore, if the applicability condition indicates one or more specific values of the characteristic its value in the candidate endpoint is added thereto; for example, if an applicability condition AC=(Version IN {6,7,8}) is not fulfilled because the version of the operating system of the candidate endpoint is Version=9, the applicability condition should become AC=(Version IN {6,7,8,9}). Moreover, if the applicability condition indicates a range of the values of the characteristic this range is expanded up to its value in the candidate endpoint; for example, if an applicability condition AC=(Memory>=5 G) is not fulfilled because the free memory space of the excluded endpoint is Memory=4 G, the applicability condition should become AC=(Memory>=4 G).

The flow of activity then merges again at block 474 from either the block 470 or the block 472. At block 474, the refiner verifies whether the same rule transformation is already present in the rule transformation file for the management policy. If at block 474 the same rule transformation is not already present in the rule transformation file for the management policy, the refiner at block 476 adds the (new) rule transformation with its frequency initialized to one. Conversely, if at block 474 the same rule transformation is already present in the rule transformation file for the management policy, the refiner at block 478 increments the frequency of the (present) rule transformation by one. In both cases, the process descends into block 480; the same point is also reached directly from the block 466 when the candidate endpoint fulfills the applicability condition or in any case when it does not cause the missing fulfillment of the applicability rule. At block 480, the refiner verifies whether a last applicability condition of the applicability rule has been processed. If at block 480 the last applicability condition of the applicability rule has not been processed, the flow of activity returns to the block 464 to repeat the same operations for a next applicability condition. Conversely, at block 480 once all the applicability conditions have been processed, the process descends into block 482, which is also reached directly from the block 450 (if the policy has been applied on the endpoint) or from the block 462 (if the similarity index of the excluded endpoint does not reach the similarity threshold). At block 482, the selector verifies whether a last endpoint has been processed. If at block 482 the last endpoint has not been processed, the flow of activity returns to the block 448 to repeat the same operations for a next endpoint.

Conversely, at block 482 once all the endpoints have been processed, the loop is exit by descending into block 484. At this point, the notifier outputs the content of the rule transformation file (for example, by displaying it on the management server). In view of the above, this indicates the rule transformations that might be applied to the applicability rule to make the management policy applicable on the excluded endpoints that are most similar to the success endpoints; for each rule transformation, the frequency (i.e., the number) is further indicated of excluded endpoints wherein the management policy would become applicable if the rule transformation was applied. This information may be used (for example, by the system administrator) to transform the applicability rule accordingly (for example, by applying the rule transformations with the highest frequencies). The flow of activity then returns to the block 402 waiting for the deployment of a next policy.

Naturally, in order to satisfy local and specific requirements, a person skilled in the art may apply many logical and/or physical modifications and alterations to the present disclosure. More specifically, although this disclosure has been described with a certain degree of particularity with reference to one or more embodiments thereof, it should be understood that various omissions, substitutions and changes in the form and details as well as other embodiments are possible. Particularly, different embodiments of the present disclosure may even be practiced without the specific details (such as the numerical values) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any embodiment of the present disclosure may be incorporated in any other embodiment as a matter of general design choice. In any case, each numerical value should be read as modified by the term about (unless already done) and each range of numerical values should be intended as expressly specifying any possible number along the continuum within the range (comprising its end points). Moreover, ordinal or other qualifiers are merely used as labels to distinguish elements with the same name but do not by themselves connote any priority, precedence or order. The terms include, comprise, have, contain and involve (and any forms thereof) should be intended with an open, non-exhaustive meaning (i.e., not limited to the recited items), the terms based on, dependent on, according to, function of (and any forms thereof) should be intended as a non-exclusive relationship (i.e., with possible further variables involved), the term a/an should be intended as one or more items (unless expressly indicated otherwise), and the term means for (or any means-plus-function formulation) should be intended as any structure adapted or configured for carrying out the relevant function.

For example, an embodiment provides a method for managing a plurality of computing machines. However, the management of the computing machines may be of any type (for example, for asset inventory/discovery, security vulnerability detection/remediation, software license control) and it may be implemented under the control of any system (see below); moreover, the computing machines may be in any number and of any physical and/or virtual type (for example, other servers, Personal Computers (PCs), tablets, smartphones, Point Of Sales (POSs), self-service kiosks).

In an embodiment, the method comprises deploying an indication of a management activity. However, the management activity may be deployed in any way (for example, by providing its content, only a link thereto, in push or pull mode with or without any dedicated deployment infrastructure); moreover, the management activity may be of any type (for example, for installing software programs, patches, changing configurations, acquiring license entitlements) and it may be defined in any way (for example, a script or even with a declarative approach without any management policy).

In an embodiment, the management activity has an applicability rule. However, the applicability rule may be of any type (for example, defined by an expression, a script, a query).

In an embodiment, the indication of the management activity is deployed to the computing machines to cause each of the computing machines having corresponding values of one or more characteristics fulfilling the applicability rule to apply the management activity on the computing machine. However, the management activity may be deployed to any number of computing machines (either indiscriminately or selectively); moreover, the applicability rule may be verified in any way (for example, by the computing machines or by the management server) according to any number and type of characteristics (for example, hardware, software, logic, dynamic, static or any combination thereof) having any number and type of values (for example, numbers, ranges, strings, flags), and the management activity may be applied in any way (for example, by invoking APIs, executable programs).

In an embodiment, the method comprises receiving corresponding results of the deploying of the management activity to the computing machines. However, the results may be received in any way (for example, by messages, shared variables, in push or pull mode).

In an embodiment, the results indicate that the management activity has been applied successfully on corresponding success computing machines (of the computing machines) and that the management activity has not been applied on corresponding excluded computing machines (of the computing machines). However, the results may relate to any number of success, failed and excluded computing machines and they may be in any form (for example, a simple return code, with or without additional information, such as an error message, the applicability conditions that are not fulfilled, the values of the characteristics of the computing machine, all or only the ones that do not fulfill the applicability rule).

In an embodiment, the method comprises determining a success fingerprint according to corresponding values of one or more further characteristics of at least part of the success computing machines. However, the success fingerprint may be determined in any way (for example, by common characteristics, statistical analysis techniques) according to any number and type of values of any number and type of further characteristics (either the same or different with respect to the characteristics that are used to define the applicability rule), with respect to any number of excluded computing machines (from a subset thereof to all of them indiscriminately).

In an embodiment, the method comprises selecting one or more candidate computing machines of the excluded computing machines according to a comparison of the corresponding values of the further characteristics of the excluded computing machines with the success fingerprint. However, the candidate computing machines may be selected in any number and in any way (for example, calculating the corresponding similarity indexes or even directly by verifying one or more selection conditions, such as the match of the most relevant further characteristics).

In an embodiment, the method comprises determining one or more rule transformations and frequencies of the rule transformations for the candidate computing machines according to a comparison of the corresponding values of the characteristics of the candidate computing machines with the applicability rule. However, the rules transformations and the corresponding frequencies may be determined in any way (for example, by transforming an endpoint fingerprint of each candidate endpoint, defined by the values of its characteristics, into a Boolean expression and then comparing it with the applicability rule).

In an embodiment, each of the rule transformations is adapted to make the applicability rule fulfilled by a number of the candidate computing machines defining the corresponding frequency. However, the rule transformation may be of any type (for example, a text, a command, involving the removal of applicability conditions, their relaxation or any combination thereof); moreover, the frequency may be represented in any way (for example, by a number, a percentage).

In an embodiment, the method comprises providing an indication of the rule transformations and of the corresponding frequencies. However, the rule transformation and their frequencies may be provided in any way (for example, by outputting or notifying them to any number of persons and/or by passing them to a software program adapted to update the applicability rule directly).

In an embodiment, the rule transformations and the corresponding frequencies are for use in transforming the applicability rule accordingly. However, this information may be used in any way (for example, manually, automatically or semi-automatically, in test mode to generate the applicability condition, in production mode to fix/refine it).

In an embodiment, the step of selecting one or more candidate computing machines comprises calculating corresponding similarity indexes of the excluded computing machines. However, the similarity indexes may be of any type (for example, numbers, categories).

In an embodiment, the similarity index of each of the excluded computing machines is calculated according to a comparison of the values of the further characteristics of the excluded computing machine with the success fingerprint. However, the similarity index may be calculated in any way (for example, by combining multiple similarity components or directly as a whole).

In an embodiment, the step of selecting one or more candidate computing machines comprise selecting the candidate computing machines according to a comparison of the corresponding similarity indexes with a similarity threshold. However, the similarity threshold may be of any type (for example, determined dynamically or pre-defined, even independent of the maximum value of the similarity indexes).

In an embodiment, the step of calculating corresponding similarity indexes comprises calculating the similarity index of each of the excluded computing machines by combining one or more similarity components. However, the similarity components may be in any number and of any type, and they may contribute to the similarity index in any way (for example, in positive terms for increasing it and/or in negative terms for decreasing it, by summing, multiplying them, with or without any weighing).

In an embodiment, each similarity component is for a matching further characteristic of the further characteristics of the excluded computing machine that is comprised in the success fingerprint and has the corresponding value in the excluded computing machine matching the corresponding value in the success fingerprint. However, the possibility is not excluded to take into account additional, alternative or different similarity components (for example, in negative terms for the values of the characteristics of the candidate computing machine that do not match the success fingerprint).

In an embodiment, the step of calculating the similarity index comprises calculating the similarity index by combining the similarity components to contribute to the similarity index each with a weight decreasing with a cardinality of the value of the corresponding matching further characteristic in the success fingerprint. However, the cardinality of the matching further characteristic may be defined in any way (for example, by the number of values, the extent of a range); in any case, the possibility is not excluded of weighting the similarity components in additional, alternative or different ways (for example, according to a type of the characteristics).

In an embodiment, the step of calculating the similarity index comprises calculating the similarity index by combining the similarity components to contribute to the similarity index each with the corresponding weight decreasing exponentially with the cardinality of the value of the corresponding matching further characteristic in the success fingerprint. However, each similarity component may vary with the corresponding cardinality in different, additional or alternative ways (for example, with linear or logarithmic laws).

In an embodiment, the step of selecting one or more candidate computing machines comprises calculating the similarity threshold according to a maximum value of the similarity indexes corresponding to the success computing machines. However, the maximum value of the similarity indexes may be calculated in any way according to their definition (even when this requires calculating the similarity indexes of all the success computing machines), and the similarity threshold may be determined in any way accordingly (for example, equal to any percentage of the maximum value up to equal thereto).

In an embodiment, the step of determining a success fingerprint comprises determining the success fingerprint by assigning each common further characteristic of the further characteristics of the at least part of the success computing machines to the success fingerprint in association with a union of the values of the common further characteristic of the at least part of the success computing machines. However, the union of values in the success computing machines of each common further characteristic may be defined in any way (for example, by listing them or by defining a range enclosing them).

In an embodiment, the step of determining a success fingerprint comprises determining the success fingerprint according to the corresponding values of the further characteristics of a subset of the success computing machines. However, this subset may comprise any number of success computing machines and it may be determined in any way (for example, by statistical analysis techniques); in any case, the success computing machines may be decimated always, only when their number is higher than a predefined threshold, or never.

In an embodiment, the applicability rule comprises one or more applicability conditions contributing to define the applicability rule. However, the applicability conditions may be in any number and of any type (for example, terms based on any comparison operators, such as equal, greater than, lower than, comprised in, applied to any number of characteristics, such as single characteristics or multiple characteristics combined in any way, like summed, divided) and they may contribute to define the applicability rule in any way (for example, combined with logical operators, such as AND, OR, NOT, XOR, used in any programming constructor, such as IF, WHILE, UNTIL).

In an embodiment, the step of determining one or more rule transformations comprises (for each of the applicability conditions based on at least one of the characteristics that is not available in at least one of the candidate computing machines) determining one of the rule transformations by removing the applicability condition from the applicability rule. However, the possibility is not excluded of removing the applicability condition in other cases as well (for example, when it is not fulfilled by the candidate computing machines as well).

In an embodiment, the step of determining one or more rule transformations comprises (for each of the applicability conditions based on at least one of the characteristics that is not fulfilled by the corresponding values in at least one of the candidate computing machines) determining one of the rule transformations by relaxing the applicability condition to become fulfilled by the corresponding values in the at least one candidate computing machine. However, the applicability condition may be relaxed in any way (for example, by adding a safety margin); moreover, the possibility is not excluded of relaxing the applicability condition in other cases as well (for example, when the corresponding further characteristic is not available on the candidate computing machines as well by making it in logical OR).

In an embodiment, the step of providing an indication of the rule transformations and of the corresponding frequencies comprises outputting the indication of the rule transformations and of the corresponding frequencies. However, this information may be output in any way (for example, by displaying, printing it).

In an embodiment, the step of deploying an indication of a management activity comprises deploying a management policy comprising the applicability rule and instructions for executing the management activity to cause each of the computing machines to enforce the management policy thereon. However, the management policy may be of any type (for example, with the computing machines that remain compliant with the management policy once it has been applied, such as for configuration activities, or with the compliance with the management policy that may change over time, such as for remediation activities); moreover, the management policy may be enforced on the computing machines in any way (for example, immediately or periodically, with either a centralized or a distributed approach).

Generally, similar considerations apply if the same solution is implemented with an equivalent method (by using similar steps with the same functions of more steps or portions thereof, removing some steps being non-essential, or adding further optional steps); moreover, the steps may be performed in a different order, concurrently or in an interleaved way (at least in part).

An embodiment provides a computer program configured for causing a computing system to perform the above-mentioned method when the computer program is executed on the computing system. An embodiment provides a computer program product, the computer program product comprising a computer readable storage medium having program instructions embodied therewith, the program instructions being executable by a computing system to cause the computing system to perform the same method.

However, the computer program may be implemented as a stand-alone module, as a plug-in for a pre-existing computer program (for example, the resource management tool), or even directly in the latter; moreover, the computer program may run on any computing system (see below). In any case, the solution according to an embodiment of the present disclosure lends itself to be implemented even with a hardware structure (for example, by electronic circuits integrated in one or more chips of semiconductor material), or with a combination of software and hardware suitably programmed or otherwise configured.

An embodiment provides a system comprising means configured for performing each of the steps of the above-mentioned method. An embodiment provides a system comprising a circuitry (i.e., any hardware suitably configured, for example, by software) configured for performing each of the steps of the same method. However, the system may be of any type (for example, any physical and/or virtual computing machine, either stand-alone or communicating with other computing machines via any local, wide area, global, cellular or satellite network and exploiting any type of wired and/or wireless connections); moreover, the above-described functions may be implemented entirely in any management server (with its functions that are concentrated in a single computing machine or distributed throughout two or more computing machines), or some of them may be implemented locally in the endpoints.

Generally, similar considerations apply if the system has a different structure or comprises equivalent components or it has other operative characteristics. In any case, every component thereof may be separated into more elements, or two or more components may be combined together into a single element; moreover, each component may be replicated to support the execution of the corresponding operations in parallel. Moreover, unless specified otherwise, any interactivity between different components generally does not need to be continuous, and it may be either direct or indirect through one or more intermediaries.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for managing a plurality of computing machines, the method comprising:

deploying an indication of a management activity having an applicability rule to the plurality of computing machines to cause each of the computing machines having corresponding values of one or more characteristics fulfilling the applicability rule to apply the management activity on the computing machine;

receiving corresponding results of the deploying of the management activity to each computing machine of the plurality of computing machines, the results indicating that the management activity has been applied successfully on corresponding success computing machines of the plurality of computing machines and that the management activity has not been applied on corresponding excluded computing machines of the plurality of computing machines;

determining a success fingerprint according to corresponding values of one or more further characteristics of at least part of the success computing machines;

selecting one or more candidate computing machines of the excluded computing machines according to a comparison of the corresponding values of the one or more further characteristics of the excluded computing machines with the success fingerprint;

determining one or more rule transformations and frequencies of the rule transformations for the candidate computing machines according to a comparison of the corresponding values of the characteristics of the candidate computing machines with the applicability rule, each of the one or more rule transformations being adapted to make the applicability rule fulfilled by a number of the one or more candidate computing machines defining the corresponding frequency; and providing an indication of the rule transformations and of the corresponding frequencies for use in transforming the applicability rule accordingly.

2. The method according to claim 1, wherein selecting the one or more candidate computing machines comprises:
    calculating corresponding similarity indexes of the excluded computing machines, the similarity index of each of the excluded computing machines being calculated according to a comparison of the values of the one or more further characteristics of the excluded computing machine with the success fingerprint; and
    selecting the candidate computing machines according to a comparison of the corresponding similarity indexes with a similarity threshold.

3. The method according to claim 2, wherein calculating the corresponding similarity indexes comprises:
    calculating the similarity index of each of the excluded computing machines by combining one or more similarity components each for a matching further characteristic of the one or more further characteristics of the excluded computing machine comprised in the success fingerprint and having the corresponding value in the excluded computing machine matching the corresponding value in the success fingerprint.

4. The method according to claim 3, wherein calculating the similarity index comprises:
    calculating the similarity index by combining the similarity components to contribute to the similarity index each with a weight decreasing with a cardinality of the value of the corresponding matching further characteristic in the success fingerprint.

5. The method according to claim 4, wherein calculating the similarity index comprises:
    calculating the similarity index by combining the similarity components to contribute to the similarity index each with the corresponding weight decreasing exponentially with the cardinality of the value of the corresponding matching further characteristic in the success fingerprint.

6. The method according to claim 2, wherein selecting the one or more candidate computing machines comprises:
    calculating the similarity threshold according to a maximum value of the similarity indexes corresponding to the success computing machines.

7. The method according to claim 1, wherein determining the success fingerprint comprises:
    determining the success fingerprint by assigning each common further characteristic of the one or more further characteristics of the at least part of the success computing machines to the success fingerprint in association with a union of the values of the common further characteristic of the at least part of the success computing machines.

8. The method according to claim 1, wherein determining the success fingerprint comprises:
    determining the success fingerprint according to the corresponding values of the one or more further characteristics of a subset of the success computing machines.

9. The method according to claim 1, wherein the applicability rule comprises one or more applicability conditions contributing to define the applicability rule and wherein determining the one or more rule transformations comprises:
    for each of the applicability conditions based on at least one of the characteristics that is not available in at least one of the candidate computing machines, determining one of the rule transformations by removing the applicability condition from the applicability rule.

10. The method according to claim 1, wherein the applicability rule comprises one or more applicability conditions contributing to define the applicability rule and wherein determining the one or more rule transformations comprises:
    for each of the applicability conditions based on at least one of the characteristics that is not fulfilled by the corresponding values in at least one of the candidate computing machines, determining one of the rule transformations by relaxing the applicability condition to become fulfilled by the corresponding values in the at least one candidate computing machine.

11. The method according to claim 1, wherein providing the indication of the rule transformations and of the corresponding frequencies comprises:
    outputting the indication of the rule transformations and of the corresponding frequencies.

12. The method according to claim 1, wherein deploying the indication of a management activity comprises:
    deploying a management policy comprising the applicability rule and instructions for executing the management activity to cause each of the computing machines to enforce the management policy thereon.

13. A computer program product comprising a computer readable storage medium having a computer readable program for managing a plurality of computing machines stored therein, wherein the computer readable program, when executed on a computing device, causes the computing device to:
    deploy an indication of a management activity having an applicability rule to the plurality of computing machines to cause each of the computing machines having corresponding values of one or more characteristics fulfilling the applicability rule to apply the management activity on the computing machine;
    receive corresponding results of the deploying of the management activity to each computing machine of the plurality of computing machines, the results indicating that the management activity has been applied successfully on corresponding success computing machines of the plurality of computing machines and that the management activity has not been applied on corresponding excluded computing machines of the plurality of computing machines;
    determine a success fingerprint according to corresponding values of one or more further characteristics of at least part of the success computing machines;
    select one or more candidate computing machines of the excluded computing machines according to a comparison of the corresponding values of the one or more further characteristics of the excluded computing machines with the success fingerprint;
    determine one or more rule transformations and frequencies of the rule transformations for the candidate computing machines according to a comparison of the corresponding values of the characteristics of the candidate computing machines with the applicability rule, each of the one or more rule transformations being adapted to make the applicability rule fulfilled by a number of the one or more candidate computing machines defining the corresponding frequency; and
    provide an indication of the rule transformations and of the corresponding frequencies for use in transforming the applicability rule accordingly.

14. The computer program product according to claim 13, wherein the computer readable program to select the one or more candidate computing machines further causes the computing device to:

calculate corresponding similarity indexes of the excluded computing machines, the similarity index of each of the excluded computing machines being calculated according to a comparison of the values of the one or more further characteristics of the excluded computing machine with the success fingerprint; and select the candidate computing machines according to a comparison of the corresponding similarity indexes with a similarity threshold.

15. The computer program product according to claim 14, wherein the computer readable program to calculate the corresponding similarity indexes further causes the computing device to:

calculate the similarity index of each of the excluded computing machines by combining one or more similarity components each for a matching further characteristic of the one or more further characteristics of the excluded computing machine comprised in the success fingerprint and having the corresponding value in the excluded computing machine matching the corresponding value in the success fingerprint.

16. The computer program product according to claim 15, wherein the computer readable program to calculate the similarity index further causes the computing device to:

calculate the similarity index by combining the similarity components to contribute to the similarity index each with a weight decreasing with a cardinality of the value of the corresponding matching further characteristic in the success fingerprint.

17. The computer program product according to claim 16, wherein the computer readable program to calculate the similarity index further causes the computing device to:

calculate the similarity index by combining the similarity components to contribute to the similarity index each with the corresponding weight decreasing exponentially with the cardinality of the value of the corresponding matching further characteristic in the success fingerprint.

18. The computer program product according to claim 14, wherein the computer readable program to select the one or more candidate computing machines further causes the computing device to:

calculate the similarity threshold according to a maximum value of the similarity indexes corresponding to the success computing machines.

19. The computer program product according to claim 13, wherein the computer readable program to determine the success fingerprint further causes the computing device to:

determine the success fingerprint by assigning each common further characteristic of the one or more further characteristics of the at least part of the success computing machines to the success fingerprint in association with a union of the values of the common further characteristic of the at least part of the success computing machines.

20. An apparatus comprising:

a processor, and a memory coupled to the processor, wherein the memory comprises instructions which, when executed by the processor, cause the processor to:

deploy an indication of a management activity having an applicability rule to the plurality of computing machines to cause each of the computing machines having corresponding values of one or more characteristics fulfilling the applicability rule to apply the management activity on the computing machine;

receive corresponding results of the deploying of the management activity to each computing machine of the plurality of computing machines, the results indicating that the management activity has been applied successfully on corresponding success computing machines of the plurality of computing machines and that the management activity has not been applied on corresponding excluded computing machines of the plurality of computing machines;

determine a success fingerprint according to corresponding values of one or more further characteristics of at least part of the success computing machines;

select one or more candidate computing machines of the excluded computing machines according to a comparison of the corresponding values of the one or more further characteristics of the excluded computing machines with the success fingerprint;

determine one or more rule transformations and frequencies of the rule transformations for the candidate computing machines according to a comparison of the corresponding values of the characteristics of the candidate computing machines with the applicability rule, each of the one or more rule transformations being adapted to make the applicability rule fulfilled by a number of the one or more candidate computing machines defining the corresponding frequency; and provide an indication of the rule transformations and of the corresponding frequencies for use in transforming the applicability rule accordingly.

* * * * *